(12) United States Patent
Feldman et al.

(10) Patent No.: US 6,463,167 B1
(45) Date of Patent: Oct. 8, 2002

(54) ADAPTIVE FILTERING

(75) Inventors: Andre Feldman; Yoav Bar, both of Haifa; Opher Zahavi, Hadera, all of (IL)

(73) Assignee: Philips Medical Systems Technologies Ltd., Haifa (IL)

( * ) Notice: Subject to any disclaimer, the term of this patent is extended or adjusted under 35 U.S.C. 154(b) by 0 days.

(21) Appl. No.: 08/927,422

(22) Filed: Sep. 11, 1997

(30) Foreign Application Priority Data

Sep. 19, 1996 (IL) .................................................. 119283

(51) Int. Cl.[7] .................................................. G06K 9/00
(52) U.S. Cl. ........................ 382/128; 600/442; 600/562
(58) Field of Search ................................. 382/100, 128, 382/130–134, 170–172, 173, 254, 261–264, 265, 274; 106/124.3, 124.4; 378/18; 424/572, 578; 435/11, 40.5, 46.52, 41, 70.1, 70.3, 378, 381, 284.1, 503; 600/313, 334, 358, 442, 562, 183

(56) References Cited

U.S. PATENT DOCUMENTS

| | | | | |
|---|---|---|---|---|
| 4,217,641 A | * | 8/1980 | Naparstek .................... 382/131 |
| 4,503,461 A | | 3/1985 | Nishimura .................... 358/463 |
| 4,575,799 A | * | 3/1986 | Miwa et al. ............. 128/660.06 |
| 4,633,875 A | * | 1/1987 | Turner ........................... 607/98 |
| 4,691,366 A | | 9/1987 | Fenster et al. .............. 382/266 |
| 4,714,997 A | | 12/1987 | Crawford et al. ........... 128/922 |
| 4,729,100 A | * | 3/1988 | Tsujii ............................. 378/4 |
| 4,742,301 A | * | 5/1988 | Meulen et al. .............. 324/309 |
| 4,769,362 A | * | 9/1988 | Catsimpoolas et al. ........ 514/25 |
| 4,792,900 A | | 12/1988 | Sones et al. ................. 378/98.9 |
| 4,821,213 A | * | 4/1989 | Cline et al. .................. 395/124 |
| 4,858,124 A | * | 8/1989 | Lizzi et al. ................... 600/443 |
| 4,945,478 A | * | 7/1990 | Merickel et al. ............. 382/131 |
| 4,961,425 A | * | 10/1990 | Kennedy et al. .......... 128/653.1 |
| 5,003,979 A | * | 4/1991 | Merickel et al. .......... 128/653.2 |
| 5,081,692 A | | 1/1992 | Kwon et al. ................. 358/447 |
| 5,289,520 A | * | 2/1994 | Pellegrino et al. ............ 378/37 |
| 5,304,933 A | * | 4/1994 | Vavrek et al. ............... 324/318 |
| 5,343,390 A | * | 8/1994 | Doi et al. .................... 382/132 |
| 5,359,513 A | * | 10/1994 | Kano et al. .................. 382/128 |
| 5,394,452 A | * | 2/1995 | Swerdloff et al. ............. 378/65 |
| 5,410,250 A | * | 4/1995 | Brown ......................... 324/309 |
| 5,414,622 A | * | 5/1995 | Walters ........................ 382/131 |
| 5,426,684 A | * | 6/1995 | Gaborski et al. .............. 378/62 |
| 5,465,718 A | * | 11/1995 | Hochman et al. ......... 128/653.1 |
| 5,533,081 A | * | 7/1996 | Hsieh ............................ 378/15 |
| 5,583,346 A | * | 12/1996 | Nakajima .................... 250/587 |
| 5,598,481 A | * | 1/1997 | Nishikawa et al. .......... 382/130 |
| 5,602,934 A | * | 2/1997 | Li et al. ....................... 382/128 |
| 5,644,650 A | * | 7/1997 | Suzuki et al. ................ 382/132 |
| 5,748,801 A | * | 5/1998 | Goto ............................ 382/270 |
| 5,774,599 A | * | 6/1998 | Muka et al. ................. 382/254 |
| 5,818,231 A | * | 10/1998 | Smith ........................... 324/309 |
| 5,848,198 A | * | 12/1998 | Penn ............................ 382/276 |
| 5,850,464 A | * | 12/1998 | Vogt ............................. 382/128 |
| 5,854,851 A | * | 12/1998 | Bamberger et al. .......... 382/132 |
| 5,878,746 A | * | 3/1999 | Lemelson et al. ........... 600/407 |
| 5,933,540 A | * | 8/1999 | Lakshminarayanan et al. .. 382/260 |
| 6,011,862 A | * | 1/2000 | Doi et al. .................... 382/132 |

* cited by examiner

*Primary Examiner*—Jayanti K. Patel
(74) *Attorney, Agent, or Firm*—Fenster & Company Paten Attorneys Ltd.

(57) ABSTRACT

A method of enhancing a medical image including identifying at least one physical characteristic of a tissue portion based on a characteristic of a portion of the image and applying an image processing technique to the image portion chosen based on the at least one tissue characteristic.

46 Claims, 9 Drawing Sheets

| TISSUE TYPE | LOW-PASS. | MEDIAN FILTER | HI-PASS |
|---|---|---|---|
| SPLEEN | X | | |
| LIVER | XX | X | |
| FAT | X | | |
| MUSCLE | XX | X | |
| BONE | | X | XX |

| BOUNDARY TYPE | LOW PASS. | MEDIAN FILTER | HI-PASS |
|---|---|---|---|
| BONE/MUSCLE | X | X | |
| AIR/BONE | | X | X |
| MUSCLE/AIR | | X | |

ADAPTIVE FILTERING

FIELD OF THE INVENTION

The present invention relates to the field of medical image processing and especially to image adaptive image processing.

BACKGROUND OF THE INVENTION

One of the mainstays of modern medicine is the number of available medical imaging techniques. Some of the main medical imaging techniques are X-ray CT (Computed Tomography), MRI (Magnetic Resonance Imaging), ULS (Ultra Sound) and NM (Nuclear Medicine). The physical basis of the acquired image differs between the techniques. In X-ray CT, different structures in the body are differentiated by their different X-ray density; in MRI, different structures (and some functional characteristics) are differentiated by their different type and density of hydrogen bonds; in US, different structures are differentiated by their different ultrasound propagation characteristics; and in NM, differently functioning structures are differentiated by their different metabolic processes.

Images acquired by any of the above imaging techniques are far from perfect. Image quality is constrained by many factors, most notably, the allowed safe radiation levels. In addition, the internal parts of the human body are always in motion, so imaging or image acquisition time is also a limitation on image quality.

In many cases, the acquisition process can be optimized either to enhance certain types of details in the images or to reduce the noise levels in the images. Alternatively, the acquired images are post-processed using well known image processing techniques to enhance image quality parameters. Typically, enhancement of one parameter of image quality comes at the expense of a second parameter, for example, edge detection usually adds noise to the image. In high gradient portions of the image, edge enhancement may add significant artifacts. Other types of image processing also add artifacts to the image which may be mistaken by the diagnostician to be pathological indications. Sometimes, the processing masks pathological indications, which would otherwise be apparent in the image.

One solution to the trade-off between image enhancement and artifact addition is to store several image sets, one for each type of reconstruction or post processing. This solution is problematical in two respects, first, the volume of stored data is significantly increased, and second, the diagnostician must correlate between images to ascertain whether a pathological indication is actually an artifact.

Some image processing techniques, such as median filtering and Sobel filtering, have a built in responsiveness to local texture, and so, generate fewer artifacts than other image processing techniques.

Another solution to the trade-off is to process only regions of interest (ROI) in the image which seem to require special processing. However, using ROIs can add severe artifacts to the image at the ROI border.

Yet another solution to the trade-off is to automatically extract features from the image and to apply specific processing to particular features.

SUMMARY OF THE INVENTION

It is an object of some aspects of the present invention to provide a method of post-processing images which is self-limiting to certain portions of the image.

It is another object of some aspects of the present invention to provide a method of post-processing images which generates a minimum of artifacts.

It is yet another object of some aspects of the present invention to provide a method of post-processing images in which portions of the image which correspond to different body tissues are post-processed differently.

In medical imaging, image pixel values often corresponds to an absolute physical quantity, for example, x-ray CT values correspond to tissue density, and NM values correspond to tissue absorption of radioactive materials. The acquired image pixel values represent tissue characteristics, such as x-ray absorption, perfusion and functionality. This is in contrast to most types of non-medical imaging. In photography, for example, an image pixel value corresponds to the amount of light reflected by an image feature, which is usually a value quite different from the reflectivity of the image feature, due to the complexity of the lighting environment, distance, etc.

In X-ray CT, pixel values are known as CT numbers, which are used to identify the tissue corresponding to the pixel. In this context it is useful to note that most body organs are composed of relatively large regions which have a substantially uniform tissue structure. Diseased portions of the tissue usually have a different and/or non-uniform tissue structure. In other imaging modalities, such as MRI, ultrasound and NM, the pixel values can also be used to identify tissue characteristics, as will be described more fully below.

In one preferred embodiment of the invention, the post-processing method uses an image processing technique which operates differently, depending on the pixel value, i.e., on the tissue type. In one example, the image processing technique enhances edges in the bone, but not in muscles or in liver tissue.

Additionally or alternatively, the image processing technique is responsive to local tissue texture. For example, edges are enhanced in portions of the lungs having a low local gradient but not in portions of the lungs having a high local gradient.

Additionally or alternatively, the image processing technique is responsive to boundaries between different tissue types. For example, edges could be enhanced inside muscle but not in the boundary area between muscle and bone.

Further additionally or alternatively, the image processing technique is responsive to characteristics of the boundary between neighboring tissues, such as the width thereof. For example, edges would be enhanced in a narrow boundary, but not in a wide boundary. In another example, edges would be enhanced in a low gradient boundary, but not in a high gradient boundary.

Additionally or alternatively, the image processing technique is responsive to the type of boundary between the two neighboring tissues. For example, edges would be enhanced in the boundary between muscle and fat, but not between muscle and bone.

In one preferred embodiment of the invention, the image processing technique determines the tissue type of a pixel based on the local pixel value, such as by using a look-up table. One example where individual pixel values is important is detecting bone remains in old bones. Alternatively, the image processing technique determines the tissue type based on an average (weighted) pixel value of several neighboring pixels and/or on the local texture and/or on the local variance and/or on other local image measures. Preferably, a minimum portion size is determined based on the noise level of the image. In addition, single pixels located adjacent to tissue boundaries can be classified on a pixel by pixel basis.

Additionally or alternatively, the image processing technique segments the image into single tissue areas. One way of identifying that two regions on an image are actually parts of a single organ uses contiguous image slices. Usually, the two regions will be connected in 3D through the contiguous image slices.

In a preferred embodiment of the invention, after such value-based segmentation, other supplementary techniques may be used to complete the segmentation. These techniques may be manual techniques (operator input) or may be based on artifacts created by the segmentation. In addition, these supplementary techniques may be based on factors other than tissue CT numbers. For example, an operator may indicate a pixel which has been classified as muscle and reclassify it as bone. Such reclassification will preferably extend to all the similarly classified pixels which are connected to the pixel.

The image processing techniques of some embodiments of the present invention result in more medically correct results than previously known techniques since the type of parameter enhancement depends on the tissue. In particular, the enhancement technique can be chosen so that it minimizes false positives or false negatives for a particular tissue type.

Optimizing the tradeoff between artifacts and enhancement on the basis of tissue type, results in an overall improvement of the image quality. The processing for each tissue is optimized to have maximum enhancement and minimum artifacts, resulting in a higher ratio between enhancements and artifacts for this method than for the prior art.

In one preferred embodiment of the invention the adaptive filtering is applied to the image data on a segment by segment basis. In other embodiments of the invention the segmented image is reprojected to form segmented attenuation data. Adaptive filtering is then applied to the attenuation data. The segmented data for the segments is summed, processed (by utilizing convolution or FFT methods known in the art) and then backprojected to form the adaptive filtered image. Alternatively, the separate segmented attenuation data is subject to adaptive filtering and convolution of FFT and then summed after convolution or FFT.

In a further aspect of the invention, filtering of the entire image is performed based on characteristics of the image which are presumed to exist, based on the display characteristics of the image requested by the viewer. This method does not act on the data in segments and thus no (time-consuming) segmentation of the image is required.

This method is based on the assumption that the image information which is important to a viewer of an image can be determined, in great measure, from the width (and to some extent from the level) of the window of CT values which he selects for display. Thus, it is assumed, in this preferred embodiment of the invention, that when a narrow window of CT values is chosen for display, the viewer is interested in determining the boundary of low contrast (generally large) objects. Generally, such objects can be visualized better when a low pass or other smoothing filter is applied to the image.

When a wide range of CT values is chosen for display, the supposition is that the viewer is more interested enhanced viewing of small, relatively higher contrast objects or edges. Thus, in accordance with a preferred embodiment of the invention, when a narrow range of CT values is chosen for display, the displayed image is automatically subjected to an a smoothing filter and when the range of CT values which is displayed is wide, a sharpening filter is applied to the displayed image.

There is therefore provided in accordance with a preferred embodiment of the invention, a method of enhancing a medical image including:

determining at least one physical characteristic of a tissue portion corresponding to a portion of the image; and applying an image processing technique to the image portion chosen based on the at least one tissue characteristic.

Preferably, the tissue portion is a boundary between two tissue types. Preferably, the at least one characteristic includes the width of the boundary. Additionally or alternatively, the at least one characteristic includes the gradient across of the boundary. Additionally or alternatively, the at least one characteristic includes the types of the tissues forming the boundary. Additionally or alternatively, the at least one characteristic includes tissue type. Additionally or alternatively, the at least one characteristic includes the texture of the image.

In a preferred embodiment of the invention, determining the type includes comparing the average value of the image portion to a table of value ranges, where each value range corresponds to a tissue type.

Additionally or alternatively, the extent of the portion is at least partly based on the rate of change of the characteristic. Additionally or alternatively, the at least one characteristic includes tissue texture.

In a preferred embodiment of the invention, the at least one characteristic includes the local density of the tissue. Preferably, the local density is an average of the densities of tissue surrounding the tissue portion.

Alternatively or additionally, the at least one characteristic includes the local gradient of density in the tissue. Preferably, the local gradient is an average of the gradients in tissue surrounding the tissue portion.

Alternatively or additionally, the at least one characteristic includes the metabolism of the tissue. Alternatively or additionally, the at least one characteristic includes the perfusion of the tissue.

In a preferred embodiment of the invention, the extent of the portion is at least partly based on detection of edges in the image.

Additionally or alternatively, the image processing technique is edge enhancement. Preferably, the amount of edge enhancement is responsive to the determination of the tissue characteristic.

In a preferred embodiment of the invention, the method includes segmenting the image into image portions containing the same tissue type.

In another preferred embodiment of the invention, the image processing technique is optimized for the spatial frequency spectrum of the tissue portion.

In accordance with still another preferred embodiment of the invention, the method includes:

determining at least one physical characteristic of a second tissue portion corresponding to a second portion of the image; and applying a second image processing technique to the second image portion where the second image processing technique is different from the image processing technique.

Preferably, the second image processing technique is chosen to optimized for the spatial frequency spectrum of the second tissue portion. Additionally or alternatively, the second image processing technique is of a different type from the image processing technique in type. Additionally or alternatively, the image processing technique and the second image processing technique have weights and the second image processing technique is different from the image processing technique in weight.

Alternatively or additionally, the image processing technique creates more severe artifacts than the second image processing techniques when applied to the second image portion.

Preferably, the image includes an X-ray computerized tomography image. Alternatively, the image includes a magnetic resonance image. Alternatively, the image includes an ultrasound image. Alternatively, the image includes a nuclear medicine image.

Preferably, the image portion is an image pixel. Alternatively, the image portion includes a plurality of contiguous image pixels.

In a preferred embodiment of the invention, applying an image processing technique comprises applying the technique to the pixel values of the image. Alternatively, applying an image processing technique comprises applying the technique to image precursor data which is used to construct the portion of the image. Preferably, the precursor data is generated by reprojection of image data from the image portion.

There is further provided, in accordance with a preferred embodiment of the invention, a method of filtering a medical image, having a first range of pixel values, for display, the method comprising:

receiving, from a user, a range of pixel values of the medical image to be displayed;

automatically processing the medical image, wherein the image processing is responsive to the range of pixel values to be displayed;

scaling the range of pixel values to be displayed to fit a range of gray levels to be displayed; and displaying the processed and scaled image.

Preferably, when the range is relatively narrow, automatically processing comprises smoothing the image or applying a noise reducing filter; and when the range of values is relatively large, automatically processing comprises applying an edge enhancing filter.

There is further provided apparatus for displaying a medical image comprising:

a user input which receives a range of pixel values to be displayed on a display from a user;

circuitry which receives a medical image having a first range of pixel values and scales a reduced range of said pixel values input into a range of gray level values suitable for display, in accordance with the user inputted range of values;

an image processor which processes the image using a processing method automatically responsive to the magnitude of the reduced range of pixel values; and a display which receives and displays an image which has been processed by said processor and scaled by said circuitry.

BRIEF DESCRIPTION OF THE DRAWINGS

The present invention will be more fully understood from the following detailed description of the preferred embodiments thereof, taken together with the drawings in which.

DETAILED DESCRIPTION OF THE PREFERRED EMBODIMENTS

Figure 1:
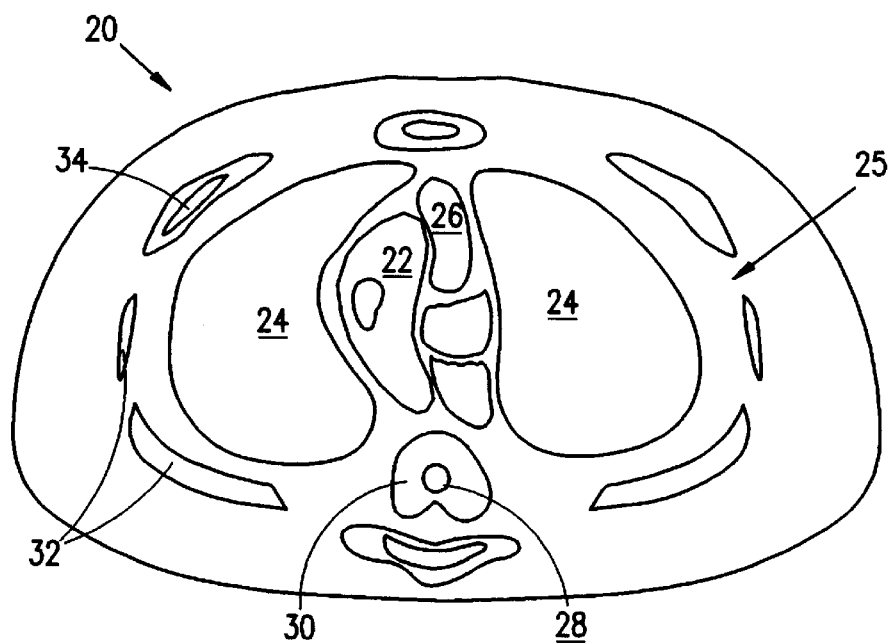
FIG. 1 is a schematic representation of a single slice X-ray CT image of a human thorax.

FIG. 1 is a schematic representation of a single image slice 20 of an X-ray CT image set of a human thorax. Many different anatomical structures are evident in image 20, including, a heart 22, lungs 24, muscle 25, an aorta 26, a spinal cord 28 encased in a backbone 30, ribs 32 and bone marrow 34 in one of the ribs. Although not shown in FIG. 1 for reasons of clarity, each anatomical structure is substantially uniquely identified and differentiated from surrounding tissue by its X-ray density and the texture of the image portion associated with the portion. In X-ray CT, pixel values in image 20 correspond directly to X-ray density. Therefore, it is possible to automatically differentiate between anatomical structures without "understanding" image 20.

Often, it is desirable to enhance certain parameters of the image, for example, it may be desirable to enhance edges in lungs 24. Usually, it is not desirable to enhance the edges in bones 32 to the same extent as in the lungs. In some cases, edge enhancing image 20, will simplify the detection of tumors within lungs 24 but will also add many undesirable artifacts in high gradient areas, such as the border between lungs 24 and muscle 25.

Figure 2:
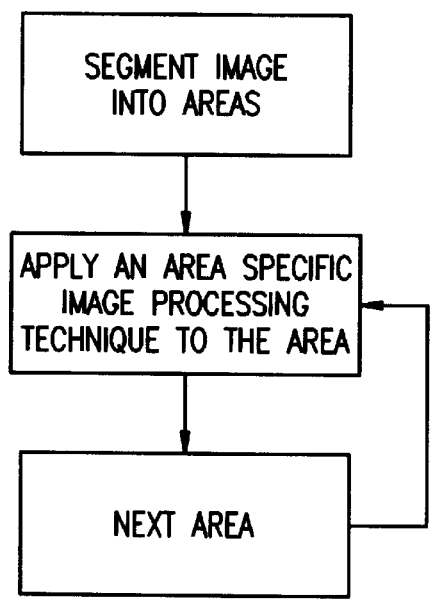
FIG. 2 is a flowchart of an image enhancement method according to a preferred embodiment of the invention.

FIG. 2 is a flowchart of an image enhancement method according to a preferred embodiment of the invention. Image 20 is first segmented into areas. The segmentation is preferably based on density (CT number) and/or on local texture, resulting in an image segmented into exclusive areas by tissue type. A tissue specific image processing technique is then applied to each area. Thus, an edge enhancing technique can be applied to lungs 24, while a contrast enhancing technique is applied to the spinal column. A special motion deblurring algorithm (or no algorithm at all) may be applied only to heart 22. Motion deblurring is especially useful if an entire slice is blurred or if a several image set of the same region are available.

As can be appreciated, the segmentation of image 20 may be performed as a separate step, as shown in FIG. 2, alternatively, the segmentation may be performed on the fly for each portion of the image. Further details of appropriate segmentation techniques are described below.

Figures 3, 4, 5:
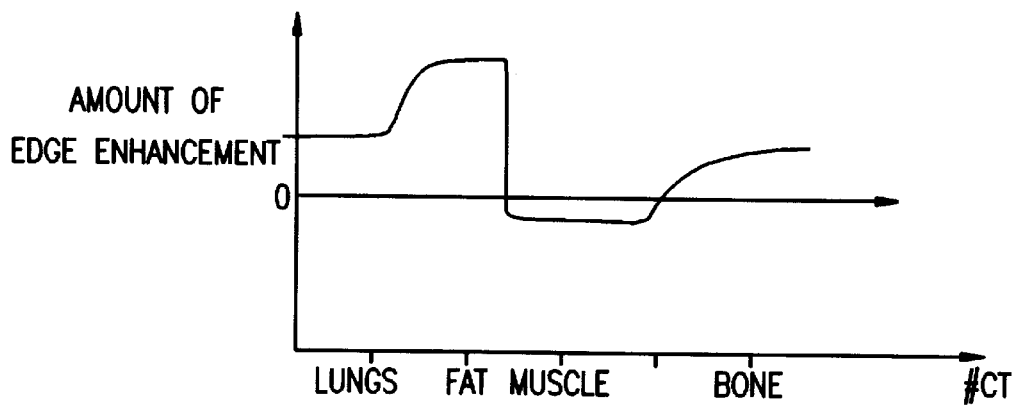
FIG. 3 is a graph showing a dependency between the amount of edge enhancement applied to a tissue and the tissue type in an exemplary embodiment of the present invention.
FIG. 4 is a table exemplifying how different image processing techniques may be applied to different tissue types.
FIG. 5 is a table exemplifying how different image processing techniques may be applied to different tissue-tissue boundaries.

FIG. 3 is a graph showing a dependency between the amount of edge enhancement applied to a tissue and the tissue type in a exemplary embodiment of the present invention. In the example of FIG. 3, lungs are edge-enhanced more and muscle tissue is smoothed to an intermediate degree.

FIG. 4 is a table exemplifying how different image processing techniques may be applied to different tissue types. As can be seen from the table, one or more of a plurality of image processing techniques may be applied to an image area depending on the tissue type in the area, for example, only smoothing (low-pass filtering) is applied to the spleen, while both median filtering and high pass filtering (edge enhancement) are applied to bone. As in FIG. 3, each image processing function may be applied at strength which is tissue dependent. This is exemplified by the number of "x"'s in each table cell.

Alternatively or additionally to segmentation by tissue type, image 20 may be segmented by tissue-tissue interface type. Thus, bone-muscle interfaces will be in a different area from either bone or muscle and may be processed differently from bone and muscle.

FIG. 5 is a table exemplifying how different image processing techniques may be applied to different tissue-tissue boundaries. As can be seen from the table, both hi-pass and median filtering are applied to bone-air interfaces, while only median filtering is applied to muscle-air interfaces. Notably, no image processing is applied to fat-bowel interfaces.

One reason for applying different image processing techniques to different boundary types is the partial volume effect. When one pixel includes both dense and less-dense tissue, the dense tissue tends to affect the pixel value in a non-linear fashion, since the pixel value is the log of the actual X-ray attenuation in the corresponding body portion. Artifacts created by the partial volume effect may be enhanced by some types of image processing techniques, such as edge enhancement, which may be appropriate to the bordering tissues. Therefore, in tissue boundary types where enhancing is reduces image quality, we preferably do not apply it.

As mentioned above with respect to FIG. 1, many image processing techniques, such as edge enhancement, create artifacts in high gradient areas, such as tissue-tissue boundary areas. In some preferred embodiments of the invention, the image processing technique used is applied responsive to the boundary width and/or local gradients.

Figure 6:
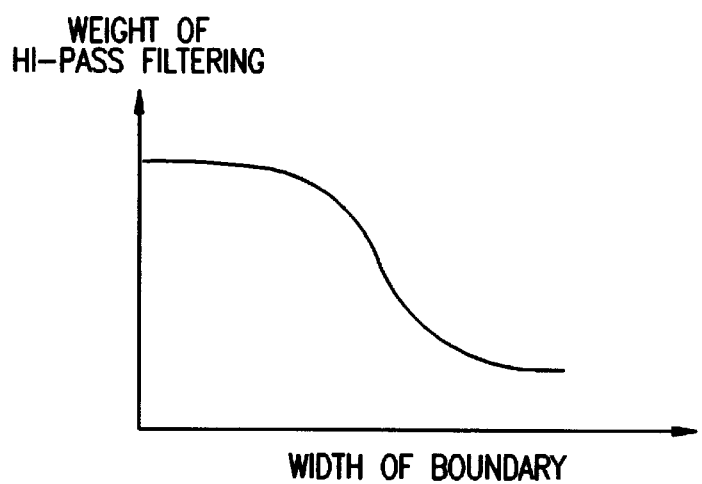
FIG. 6 is a graph showing a dependency between the weight of the hi-pass filter applied to a tissue-tissue boundary and the boundary width, in another exemplary embodiment of the present invention.

FIG. 6 is a graph showing a dependency between the weight of the hi-pass filter applied to a tissue-tissue boundary and the boundary width, in one exemplary embodiment of the present invention. In the embodiment of FIG. 6, more hi-pass filtering is applied to narrow boundaries, due to the lower probability of artifact creation. It this context, the weight of the image processing technique is defined to be a parameter of the image processing technique, such as emphasis, kernel size, frequency cut-off and the like, which parameter changes the magnitude and/or type of effect that the image processing technique has on the image. In the embodiment shown in FIG. 6, it is assumed than longer gradients (in wide boundaries) are well defined and may be damaged by enhancement, while shorter gradients (in narrow boundaries) are not as well defined, so edge enhancement is expected to enhance them. A boundary area also has another dimension, perpendicular to the gradient of the boundary. The extent of this dimension may also be used in determining how the boundary area should be processed. If this dimension is large the gradient is well defined. If however, the dimension is short or if the gradient slope decreases along this dimension, the gradient is probably not well defined and enhancement of the boundary area may be desirable (even if at parts of the boundary area the gradient is long). It is to be appreciated that the curve of FIG. 6 may be modified for different image processing techniques and different tissue-tissue boundaries.

Figure 7:
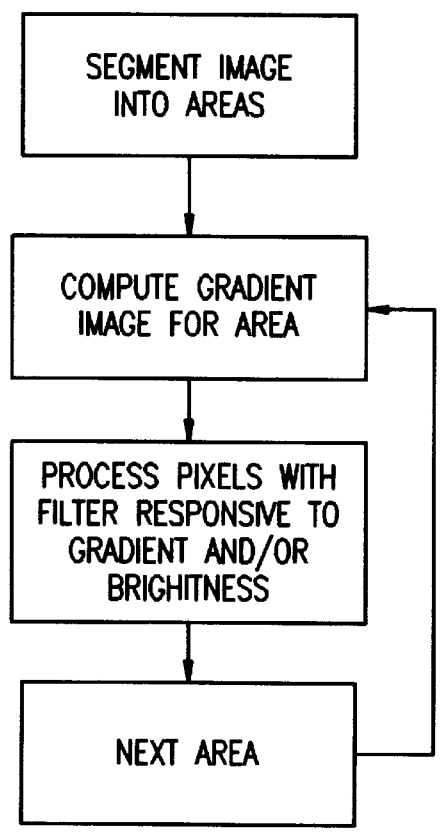
FIG. 7 is a flowchart of an image enhancement method according to another preferred embodiment of the invention.

FIG. 7 is a flowchart of an image enhancement method according to another preferred embodiment of the invention. Image 20 is first segmented into areas which correspond to tissue types. Then, a gradient image is produced for each area. The gradient images are thresholded and only image pixels having gradients below (or above) the threshold are processed with an image processing technique.

Figure 8:
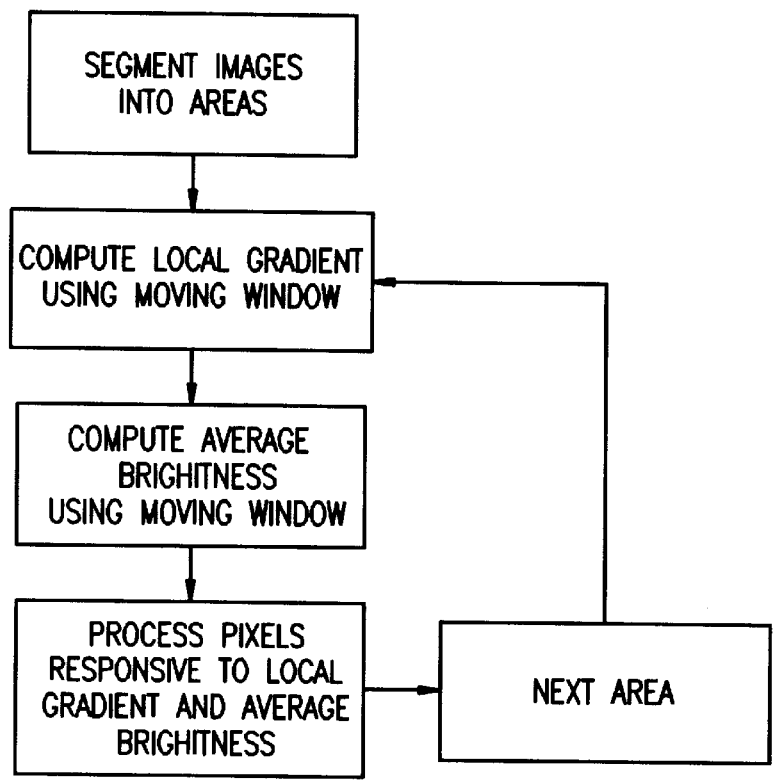
FIG. 8 is a flowchart of an image enhancement method according to another preferred embodiment of the invention.

FIG. 8 is a flowchart of an image enhancement method according to another preferred embodiment of the invention. Image 20 is first segmented into areas, which correspond to tissue types. In each area, local gradients and/or average brightness are calculated for each pixel, preferably, using a moving window scheme. Then, each pixel is processed with an image processing technique which is responsive to the calculated local gradients and/or average brightness.

Several different image segmentation techniques may be used for various embodiments of the present invention. A most simple technique is to assign each tissue type a single value or an exclusive range of pixel values (CT numbers). However, pixel values may overlap for various tissue, for example the liver and the kidneys. Additionally or alternatively, the image texture is used to determine the tissue type. Thus, lungs can be differentiated from bone not only by their different densities but also by their different textures. It should be appreciated that the image texture also depends on the image resolution, contrast resolution and on motion blurring effects.

Alternatively or additionally to using texture for classification purposes, the local average pixel value may be used. Further alternatively or additionally, local variance in pixel values and/or other local statistics may be used.

Another technique takes advantage of the fact that most anatomical structures are contiguous (in the complete image set, if not in a single slice). In a preferred embodiment of the invention the boundaries of body organs are determined, based on the edges in the image. Then the contiguous volume inside the edges is processed as a organ or single tissue type. Thus, a contiguous area of image 20 can be classified by the range of pixel values in the area, even if some of the individual pixels in the area could be classified in two or more tissue categories based on their value. In a preferred embodiment of the invention, pixels within and/or nearby an organ are considered to be part of the organ even if their density is slightly different from the standard range of values for the organ.

Figure 9:
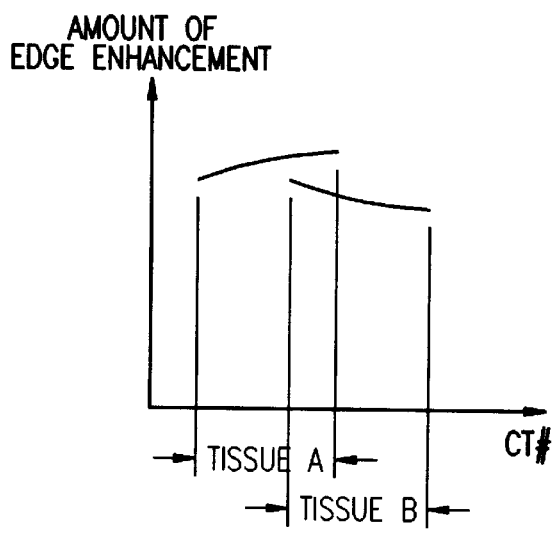
FIG. 9 is a graph showing a dependency between the amount of edge enhancement applied to a tissue and the tissue type in an exemplary embodiment of the present invention where the tissue pixel ranges overlap.

It should thus be appreciated that pixels in image 20 which have similar values may be processed differently, depending on the tissue classification of the pixel and/or on the tissue-tissue boundary type at the pixel. FIG. 9 is a graph showing a dependency between the amount of edge enhancement applied to a tissue and the tissue type in an exemplary embodiment of the present invention where the tissue pixel ranges overlap. Portions of tissue A having a high pixel value are edge enhanced more than portions of tissue B which have a low pixel value, even though the two pixel values overlap.

As can be appreciated, when two tissues, such as tissue A and tissue B overlap in image 20, an unclearly defined boundary is formed between tissue A and tissue B. In another case, the tissue in the boundary between tissue A and tissue B is intermediate in density between tissue A and tissue B. In one preferred embodiment, this border area is segmented as a separate area (and processed as described above or not at all). Alternatively, the boundary area is processed as a tissue A or a tissue B area. Further alternatively, the boundary area is processed with a weighted combination, preferably linearly weighted) of the techniques applied to tissue A and to tissue B.

In one particular preferred embodiment of the invention, the bandwidth of each tissue type is optimized by applying a tissue-dependent filter to the image. The tissue-dependent filter is preferably designed to conform to the inherent and/or to the expected spatial frequencies spectrum in each tissue type. An image processed in this fashion can have an overall better image quality than an image processed using a global function, since no unnecessary bandwidth (=noise and other undesirable effects) is added to any portion of the image.

Segmenting image 20 by tissue type is advantageous for iterative image processing techniques. One such technique is an iterative smoothing technique, where after each smoothing, the image is checked to determine if a desired degree of smoothing was achieved. Usually, when an iterative technique is applied to an image portion, the technique may cause blurring of boundaries between anatomical structures. Alternatively, the iterative technique may cause an anatomical structure to shrink or grow or to change its outline. By limiting the iterative technique to a single area which comprises a single tissue type (and perhaps, its boundary), such side-effects of the iterative technique are usually readily apparent and/or avoided. In addition, blurring of boundaries is also limited, since the iterative technique does not "escape" from the previously determined tissue boundaries.

Some embodiments of the present invention are useful also when a contrast medium is used for imaging. In a first case, the contrast medium is absorbed differently by different tissue, in particular by healthy and diseased tissues of the same body organ. Different image enhancement techniques are preferably applied to each type of tissue.

In a second case, the contrast medium mostly remains in the blood. The average brightness of different tissues is then affected (due to the increased density of the capillaries). The "new" CT numbers are then indicative of the local perfusion in the tissue, which may be different between healthy and diseased tissues, even in the same organ. Also, the local texture may be affected for the same reasons (contrast material in larger blood vessels), the extent of change in texture depending on the resolution of the image.

Figure 10:
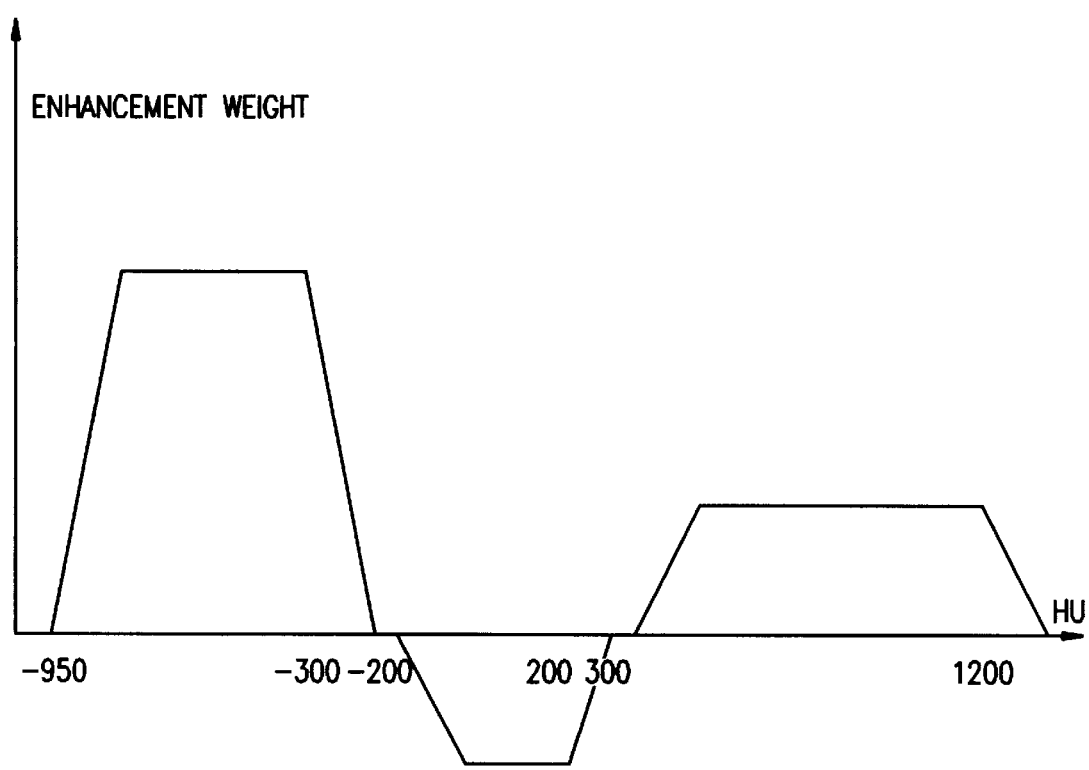
FIG. 10 is a graph showing a dependency between enhancement weight and tissue type in a preferred embodiment of the invention.

FIG. 10 is a graph showing a dependency between enhancement weight and tissue type in one preferred embodiment of the invention. In this preferred embodiment of the invention, chest images, in particular the lungs, are enhanced. In FIG. 10, positive enhancement is amplification of high frequencies and negative enhancement is smoothing by reducing high and/or medium frequencies. When referring to specific pixels in a boundary area, each pixel is classified by its CT number (in Hounsfield units or HU) and the gradient length is the distance between pixel centers. A first region of the graph, between −950 and −300 HU, corresponds to the lugs themselves. The lower border (−950) is above the density of air (−1000) in order not to enhance possible high frequency noise patterns. The high border (−300) excludes large blood vessels within the lungs, since they are visible with sufficiently sharp boundaries.

A second region, between −200 HU and 200 HU, corresponds to soft tissue. The broad range is necessary since high noise levels which are typical in such images provoke a large spread in the densities of fat and muscle.

A third region, between 300 HU and 1200 HU, corresponds to bone tissue.

The regions on the graph have a trapezoidal shape. This translates into a gradual change in filtration levels when changing from one tissue type to another. One result of the gradual change is a reduction in artifacts.

Applying the filtration at tissue boundaries is dependent on both the tissue type, gradient length (the width of the boundary area) and gradient magnitude. In lung tissue, no filtering is applied if the gradient slope is over 1000 HU or if the gradient length is four pixels or more. Thus, artifacts at the borders of the lungs are prevented. In soft tissue, if the gradient slope is over 3000 HU or if the gradient length is two pixels or more, no filtration is applied. Thus, smoothing of naturally sharp boundaries is prevented. In bone tissue, if the gradient slope is over 150 HU or if the gradient length is three pixels or more, no filtering is applied. Thus, relatively moderate smoothing is applied within bone, where high frequencies are normally already present.

Software for executing this embodiment is supplied in a software appendix attached to Israel Patent Application 119283, filed Sep. 19, 1996, the specification of which is incorporated herein by reference. This software was written for a VLSI gate array processor and can run on the following CT devices available from Elscint Ltd. of Haifa Israel: CT Twin Flash, model #10071551302, CT Twin, model #10071550007, CT Twin II, model #10071551203, Helicat Flash, model #10071550809, Helicat, model #10071551005 and Helicat II, model #10071551104. In a preferred embodiment of the invention, the exact parameters of FIG. 10 are user changeable.

Adaptive filtering utilizing many of the principles of the methodology described above can also be applied in various other ways.

Figure 11:
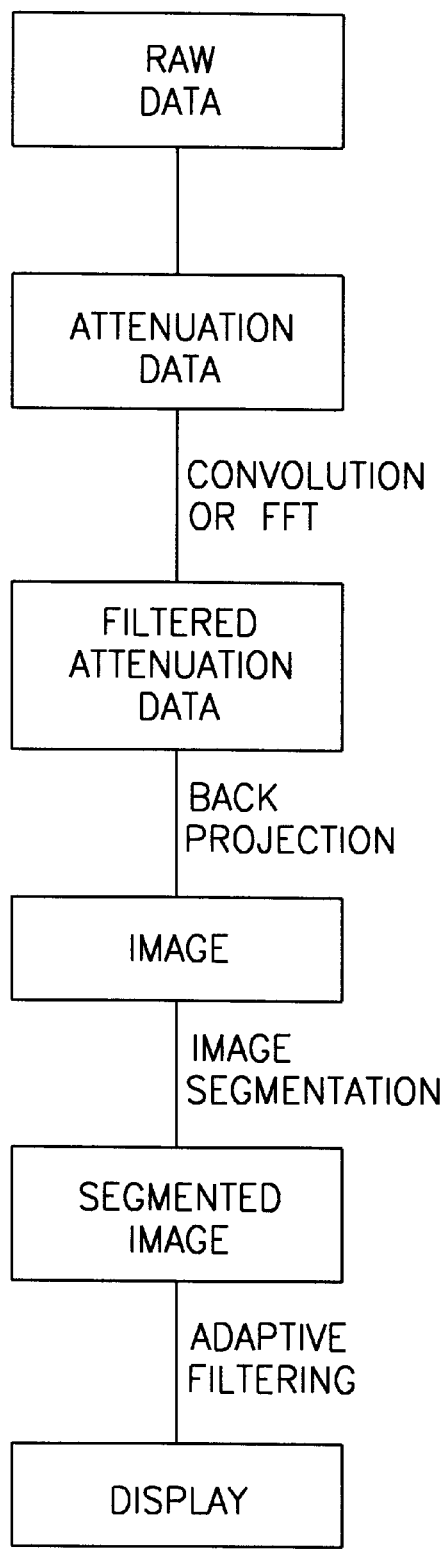
FIGS. 11–13 show flow diagrams of three different methods for applying the principles of the invention to images.
Figure 12:
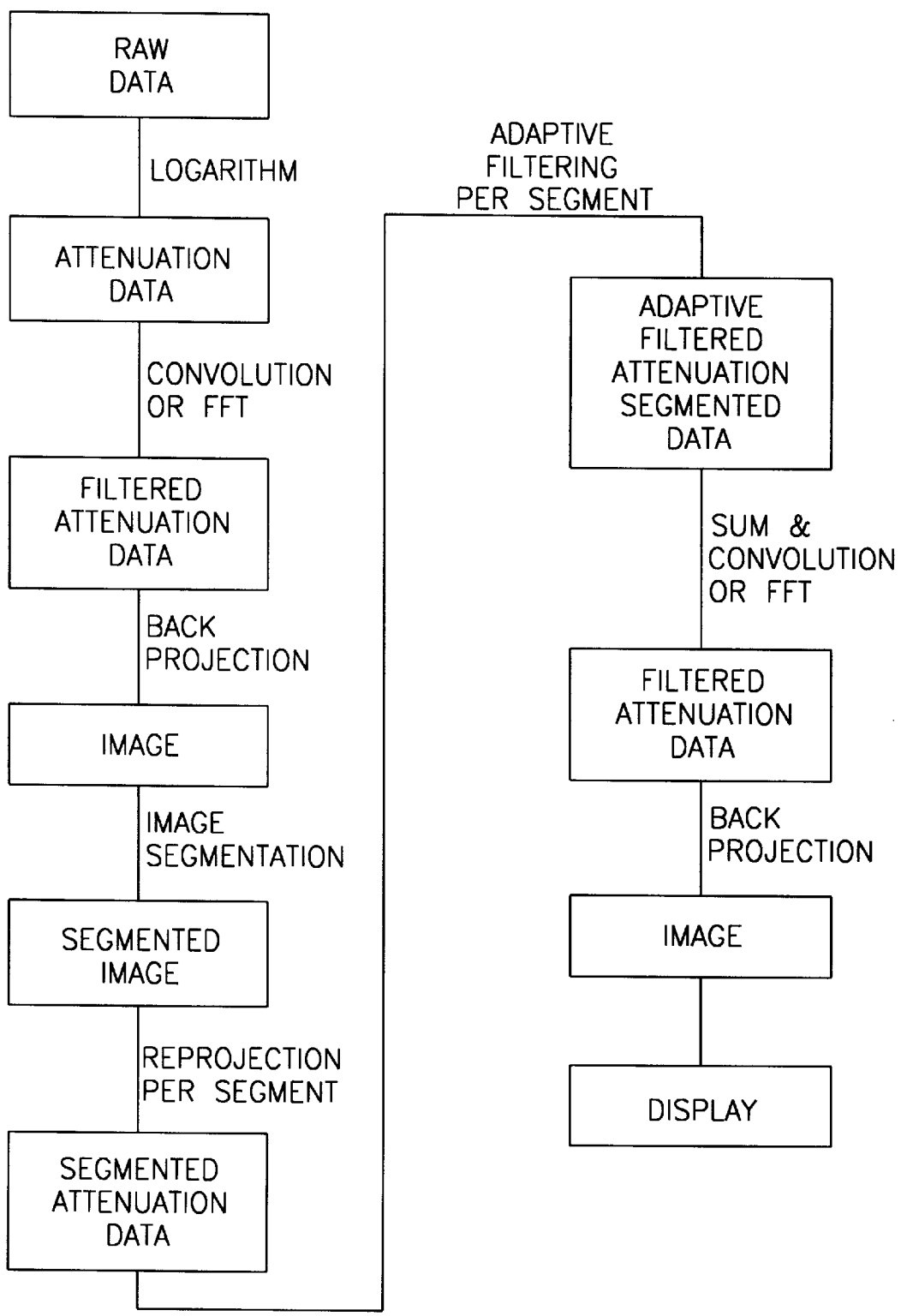
Figure 13:
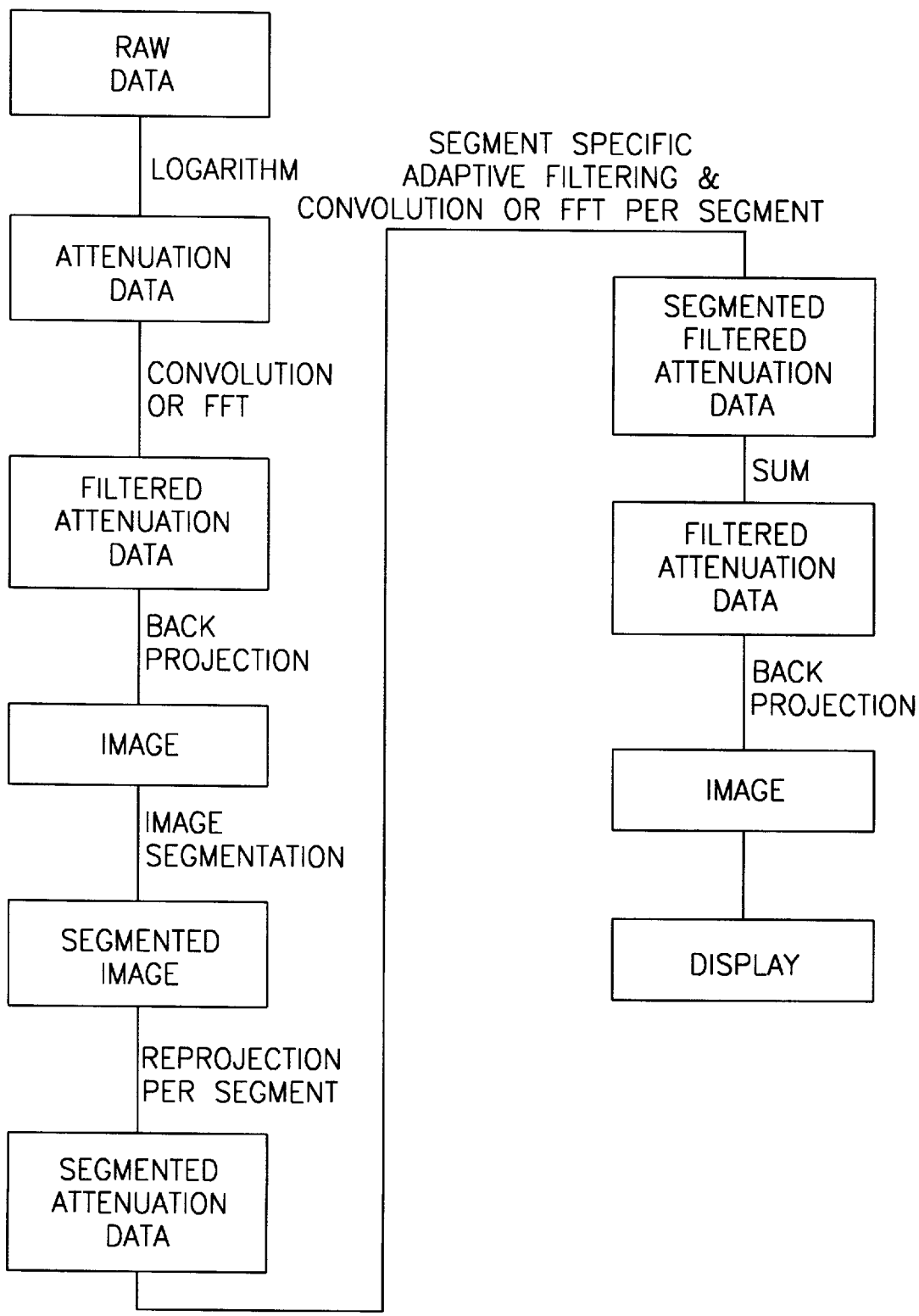

FIGS. 11–13 are flow charts which outline the methodology of the above described method (FIG. 11) and two additional closely related methods.

In FIG. 11 raw data is acquired and the logarithm of the raw data is convolved or filtered to produce filtered data which is suitable for back projection. This data is backprojected to form an image which is segmented and filtered either prior to or in conjunction with its display.

In FIG. 12 a preliminary image is constructed by filtering and backprojection in the normal manner. The image is segmented, preferably using the same techniques as are described above with respect to the method illustrated using FIGS. 1–11. Each of these segments is separately reprojected to form sets of projection data each corresponding to the "attenuation data" which would have been generated if only that segment had been present in the image. This raw data is referred to herein as "segmented attenuation data."

Filtering techniques, corresponding to those described above with respect to the method of FIGS. 1–11 are then applied to the segmented raw data which is then summed, and subjected to the usual filtered back-projection to form an image which is displayed.

FIG. 13 illustrates an adaptive image processing method in which the processing is the same as that illustrated in FIG. 12 through the stage of generating the segmented raw data. However, in contrast to the method described in conjunction with FIG. 12, the segmented raw data for each segment is separately subjected to convolution either together with or after segment specific filtering. This allows for combining the segment sensitive filtering and the convolution or even to utilizing somewhat different convolution algorithms for the different segments. The filtered and convolved segmented raw data is then summed and back-projected or, optionally is back projected and then summed.

In a further aspect of the invention, filtering of the entire image is performed based on characteristics of the image which are presumed to exist, based on the display characteristics of the image requested by the viewer. This method does not act on the data in segments and thus no (time-consuming) segmentation of the image is required.

This method is based on the assumption that the image information which is important to a viewer of an image can be determined, in great measure, from the width (and to some extent the level) of the window of CT values which he selects for display. Thus, it is assumed, in this preferred embodiment of the invention, that when a narrow window of CT values is chosen for display, the viewer is interested in determining the boundary of low contrast (generally large) objects. Generally, such objects can be visualized better when a low pass or other smoothing filter is applied to the image.

When a wide range of CT values is chosen for display, the supposition is that the viewer is more interested enhanced viewing of small, relatively higher contrast objects or edges. Thus, in accordance with a preferred embodiment of the invention, when a narrow range of CT values is chosen for display, the displayed image is automatically subjected to an a smoothing filter and when the range of CT values which is displayed is wide, a sharpening filter is applied to the displayed image.

It should be understood that while the principle on which window based adaptive filtering is based probably applies to most medical images, it is most easily applied to those images, such as CT images, in which the image pixel values have a "physical" meaning. In such images, the range of values represents an actual range of a physical variable and as such has a more exact correspondence to the desired image processing.

In particular, it has been found that the amount of smoothing/edge enhancement which is desirable is dependent not only on the range of values but also on the type of study. Thus, the image processing, in a preferred embodiment of the invention, is dependent not only on the range of values being displayed but also on the type of study being displayed.

Figure 14:
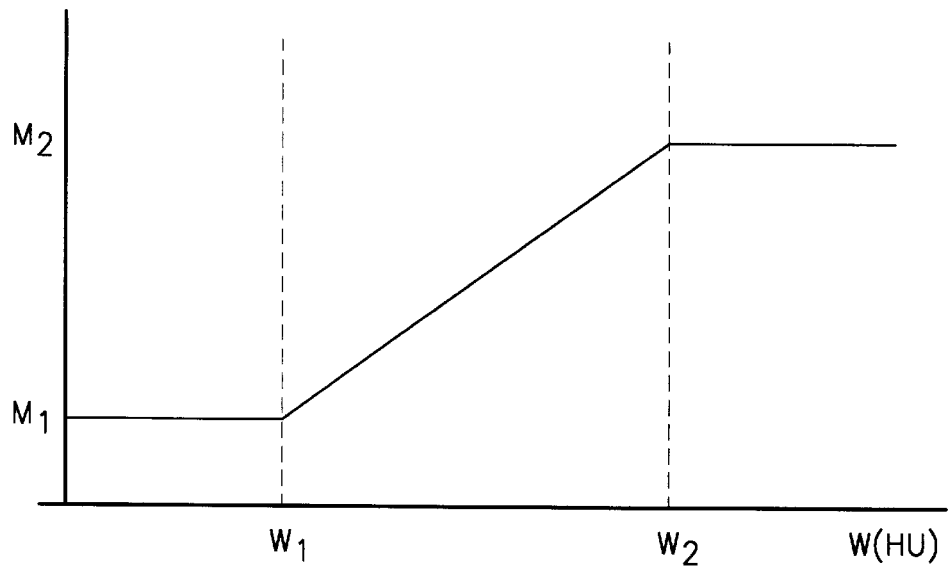
FIG. 14 shows a generalized curve of filter strength as a function of range of CT numbers to be displayed, in accordance with a preferred embodiment of the invention.

FIG. 14 shows a general graph of filter strength (M) as a function of range of CT numbers (W) in accordance with a preferred embodiment of the invention. In the graph of FIG. 14, the filter strength is set to $M_1$ for all ranges of W below $W_1$ and is set to $M_2$ for all values of W above $W_2$. For intermediate values of W, a linear relationship between W and M is shown. While such a relationship is utilized in a preferred embodiment of the invention, the relationship may be S-shaped or may have other shapes, in accordance with other preferred embodiments of the invention.

While in preferred embodiments of the invention, as illustrated below, M1 is a smoothing filter and M2 is a sharpening filter, in other situations both may be sharpening filters, both may be smoothing filters, or either one may represent no filtration at all. In general, the values of M and the filtering itself are related, in a preferred embodiment of the invention, by the following:

$$O_k = I_k - \beta M(AV - I_k),$$

where $O_k$ is the output value of a pixel k, $I_k$ is the input value of the pixel AV is the average value of the pixel and the pixels surrounding pixel k (usually 9 pixels for an 3×3 smoothing kernel) and β equals 1/150 for positive M and −1/100 for negative M.

For M<−100, the filter is applied in steps of −100 such that successive applications of 3×3 filters corresponding to M=−100 are applied until the total amount of M is applied. It should be understood that this results in an effective kernel which is larger than 3×3.

As indicated above, the choice of filtering parameters is generally dependent on the type of study being examined. In particular, in accordance with preferred embodiments of the invention, the following values are used:

Lung Protocol
W1=128, M1=−50; W2=1280, M2=+400. This results (for a particular image acquisition protocol), at M1, in a reduction of cut off spatial frequency from 9 lp/cm to 8 lp/cm and a reduction in noise (expressed in standard deviation) from 7 CT units to 5 CT units. At M2, the cut-off is not changed but the MTF (modulation transfer function) at 7 lp/cm is changed from 3% to 15%, sharpening the image.

Head Protocol
W1=256, M1=−450; W2=2560, M2=+100. This results (for a particular image acquisition protocol), at M1 in the frequency cut-off changing from 21 lp/cm to 7 lp/cm with the noise dropping (standard deviation) from 100 CT units to 10 CT units. At M2 the cut-off frequency is unchanged and the MTF at 20 lp/cm is changed from 2% to 5%.

Figure 15:
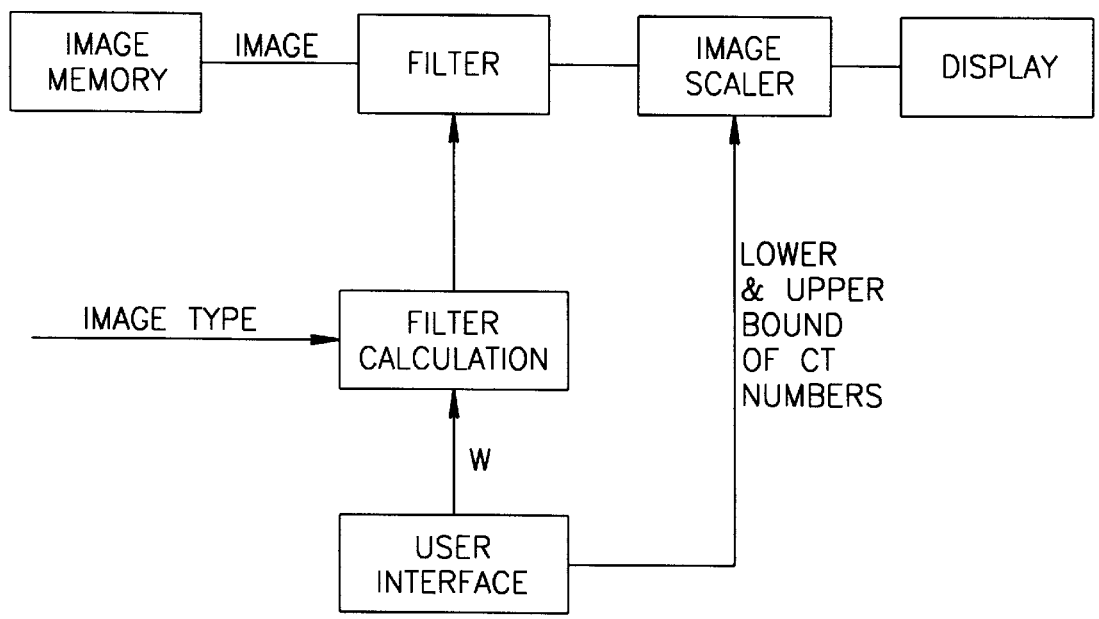
FIG. 15 is a block diagram of a system for the application of automatic filtering in accordance with a preferred embodiment of the invention.

FIG. 15 shows a block diagram of a system suitable for the application of the method of automatic filtering based on windowing to medical images. An image memory 10 contains an image which is to be displayed on a display 12. A user inputs the range of values in the image which are to be displayed over the gray level range available on the display, normally 256 gray levels into a user interface which transfers the range to be displayed to an image scaler 14 and to a filter calculator 16. Filter calculator 16 also receives an indication of the type of image which is being displayed, for example whether the image is a lung image or a head image, the slice thickness, the image resolution, pixel size, etc.. Filter calculator 16 sends filter values and instructions to an image processor such as a filter 18 which receives the image from image memory 12 and which passes it, after filtering to image scaler 14 for scaling and display on a display, such as a CRT 20 in accordance with the instructions it has received from the user interface. As in conventional systems, scaler 14 scales down the levels to be displayed if the number of CT levels is greater than the number of available gray levels for display, as for example where 800 CT levels are to be displayed on a display having a capacity of 256 gray levels.

If the number of gray levels is greater than the number of CT levels, the scaler scales up the CT levels to fit the available range of gray levels.

In some preferred embodiments of the invention filter 18 is an image processor which acts on the image in accordance with the filtering instructions supplied by filter calculator 16. The other functional blocks (and even filter 18) shown in FIG. 15 can be constructed in a conventional manner or the functions of the blocks can be performed in a general purpose or special purpose computer.

Although the present invention has been described with respect to x-ray CT images, it is equally applicable to other types of medical imaging (although the methods of FIGS. 12 and 13 are only applicable to two dimensional images reconstructed from transverse views. Pixel values may correspond to tissue type, tissue function and/or other types of internal information. As with X-ray CT, when applying image enhancing techniques to the image, the internal structures of the body shown in the image may be divided into regions. Each region may, optimally, be enhanced in a different manner.

For example in MRI images, T1 relaxation times, T2 relaxation times, and proton densities are physical values which correspond directly to pixel values. Different tissues have different T1, T2 and Proton densities. In particular, tumors may be detected based on these physical values. When enhancing such an image, it is important to not to affect the boundary between healthy tissue and tumorous tissue. In MRI spectrography, the pixel values correspond to emission frequencies (chemical composition) of the tissue. In MRI angiography, tissues perfused with "new" blood and tissues perfused with "old" blood can be differentiated. In other types of MRI imaging sequences, the temperature of body tissues can be differentiated.

In NM images, the metabolism and/or other types of functioning of various body tissues can be differentiated. Highly functioning tissues should usually be image enhanced in other manners than less functioning tissues.

In Ultrasound images, the boundaries between tissues are clearly defined. The scattering characteristics of tissues depends on their texture (and type). Thus, different tissues may require different image enhancement and image processing techniques for optimal image generation. Similar considerations often apply to digital radiographic and angiographic subtraction (DSA) images.

It will be appreciated by a person skilled in the art that the present invention is not limited to what has thus far been described. Rather, the scope of the present invention is limited only by the claims which follow:

What is claimed is:

1. A method of enhancing a medical image comprising:
    identifying at least one physical characteristic of a tissue portion based on at least one characteristic of a portion of the image, wherein the at least one characteristic includes the local gradient of density in the image portion; and
    applying a first image processing technique, to the image portion, the characteristics of the image processing technique being based on the at least one tissue characteristic and on the local density values of the tissue portion.

2. A method according to claim 1, wherein the tissue portion is a boundary between two tissue types.

3. A method according to claim 2, wherein the at least one characteristic includes the width of the boundary.

4. A method according to claim 2, wherein the at least one characteristic includes the types of the tissues forming the boundary.

5. A method according to claim 4 and including identifying tissue types forming the boundary.

6. A method according to claim 5 wherein identifying the tissue types includes determining the texture of the image.

7. A method according to claim 5, wherein identifying the tissue type comprises comparing the average value of the image portion to a table of value ranges, wherein each value range corresponds to a tissue type.

8. A method according to claim 2, wherein the image processing technique is edge enhancement.

9. A method according to claim 8, wherein the amount of edge enhancement is responsive to the identification of the tissue characteristic.

10. A method according to claim 1, wherein the extent of the portion is at least partly based on the rate of change of the characteristic.

11. A method according to claim 1, wherein the local density is an average of the densities of tissue surrounding the tissue portion.

12. A method according to claim 1 wherein the local gradient is an average of the gradients in tissue surrounding the tissue portion.

13. A method according to claim 1, wherein the extent of the portion is at least partly based on detection of edges in the image.

14. A method according to claim 1, comprising segmenting the image into image portions containing the same tissue type.

15. A method according to claim 1, wherein the image processing technique is optimized for the spatial frequency spectrum of the tissue portion.

16. A method according to claim 1, and comprising:
    identifying at least one physical characteristic of a second tissue portion based on a characteristic of a second portion of the image; and
    applying a second image processing technique to the second image portion wherein the second image processing technique is different from the first image processing technique.

17. A method according to claim 16, wherein the second image processing technique is chosen to optimized for the spatial frequency spectrum of the second tissue portion.

18. A method according to claim 16, wherein the second image processing technique is of a different type from the first image processing technique.

19. A method according to claim 16, wherein the first image processing technique and the second image processing technique are of the same type, said type having at least one weight and wherein the second image processing technique has at least one different weight from the first image processing technique.

20. A method according to claim 16, wherein the first image processing technique creates more severe artifacts than the second image processing techniques when applied to the second image portion.

21. A method according to claim 1, wherein the image comprises an X-ray computerized tomography image.

22. A method according to claim 1, wherein the image comprises a magnetic resonance image.

23. A method according to claim 1, wherein the image comprises an ultrasound image.

24. A method according to claim 1, wherein the image comprises a nuclear medicine image.

25. A method according to claim 1, wherein the image portion is an image pixel.

26. A method according to claim 1, wherein the image portion comprises a plurality of contiguous image pixels.

27. A method according to claim 1, wherein applying an image processing technique comprises applying the technique to the pixel values of the image.

28. A method of filtering a medical image, having a first range of pixel values, for display, the method comprising:
receiving, from a user, a range of pixel values of the medical image to be displayed;
automatically processing the medical image, wherein the image processing is responsive to the range of pixel values to be displayed;
scaling the range of pixel values to be displayed to fit a range of gray levels to be displayed; and
displaying the processed and scaled image.

29. A method of filtering according to claim 28 wherein, when the range is relatively narrow, automatically processing comprises smoothing the image or applying a noise reducing filter; and
when the range of values is relatively large, automatically processing comprises applying an edge enhancing filter.

30. Apparatus for displaying a medical image comprising:
a user input which receives a range of pixel values to be displayed on a display from a user;
circuitry which receives a medical image having a first range of pixel values and scales a reduced range of said pixel values input into a range of gray level values suitable for display, in accordance with the user inputted range of values;
an image processor which processes the image using a processing method automatically responsive to the magnitude of the reduced range of pixel values; and
a display which receives and displays an image which has been processed by said processor and scaled by said circuitry.

31. A method of enhancing a medical image comprising:
identifying a tissue portion based on a characteristic of a portion of the image;
reprojecting image data from the tissue portion to form segmented attenuation data;
applying at least a spatial filtering step to form filtered segmented data, responsive to a classification of the tissue portion; and
back projecting the filtered segmented data to form an adaptively filtered image.

32. A method according to claim 31 wherein back projecting includes convolving or applying an FFT to the filtered segmented data.

33. A method of enhancing a medical image comprising:
identifying a plurality of tissue portions based on a characteristics of corresponding portions of the image;
reprojecting image data from the tissue portions to form a plurality of segmented attenuation data sets;
applying at least a spatial filtering step to at least one of the segmented attenuation sets to form filtered segmented data, responsive to a classification of the tissue portion; and
back projecting the filtered segmented data to form an adaptively filtered image.

34. A method according to claim 33 wherein applying at least a spatial filtering step comprises:
applying at least a spatial filtering step to a plurality of the segmented attenuation sets to form a plurality of filtered segmented data, responsive to a classification of the tissue portion, wherein a different filter is applied to different tissue portions.

35. A method according to claim 34 including summing the segmented attenuation data sets associated with different portions and applying a convolution or FFT to the summed data prior to back projection of the summed data.

36. A method according to claim 34 including separately applying a convolution or FFT to the filtered segmented data of the different portions prior to back projection.

37. A method according to claim 33 including summing the segmented attenuation data sets associated with different portions and applying a convolution or FFT to the summed data prior to back projection of the summed data.

38. A method according to claim 33 including separately applying a convolution or FFT to the filtered segmented data of the different portions prior to back projection.

39. A method of enhancing a medical image comprising:
determining local image values and a local gradient of image values at a portion of the image; and
applying a parametric image processing technique, to the image portion, the parameters of the image processing technique being responsive to the local gradient and the local density values.

40. A method according to claim 39 and including identifying a boundary between two image portions of an image and applying the first image processing technique to the boundary.

41. A method according to claim 40 wherein the parameters of the image processing technique is further responsive to the width of the boundary.

42. A method according to claim 40 wherein the parameters of the image processing technique is responsive to the types of tissues forming the boundary.

43. A method according to claim 39 wherein the parameters of the image processing technique is responsive to the types of tissues forming the boundary.

44. A method according to claim 39 wherein the local density value is an average of the density values of the density of tissues surrounding the tissue portion.

45. A method according to claim 39 wherein the characteristics of the image processing technique are determined on a pixel by pixel basis.

46. A method according to claim 39 wherein the image processing technique is a filtering technique.

* * * * *

UNITED STATES PATENT AND TRADEMARK OFFICE
CERTIFICATE OF CORRECTION

PATENT NO.    : 6,463,167 B1
DATED         : October 8, 2002
INVENTOR(S)   : Andre Feldman et al.

It is certified that error appears in the above-identified patent and that said Letters Patent is hereby corrected as shown below:

Column 13, line 50 to Column 16, line 56,
Cancel beginning with "1. A method of enchancing...." to and including ".....is a filtering technique" and insert the following claims:

1. A method of enhancing a medical image comprising:
   identifying at least one physical characteristic of a tissue portion based on at least one characteristic of a portion of the image, wherein the at least one characteristic includes the local gradient of density in the image portion; and
   applying a first image processing technique, to the image portion, the characteristics of the image processing technique being based on the at least one tissue characteristic and on the local density values of the tissue portion,
   wherein the extent of the portion is at least partly based on the rate of change of the characteristic.

2. A method according to claim 1, wherein the tissue portion is a boundary between two tissue types.

3. A method according to claim 2, wherein the at least one characteristic includes the width of the boundary.

4. A method according to claim 2, wherein the at least one characteristic includes the types of the tissues forming the boundary.

5. A method according to claim 4 and including identifying tissue types forming the boundary.

6. A method according to claim 5 wherein identifying the tissue types includes determining the texture of the image.

7. A method according to claim 5, wherein identifying the tissue type comprises comparing the average value of the image portion to a table of value ranges, wherein each value range corresponds to a tissue type.

8. A method according to claim 2, wherein the image processing technique is edge enhancement.

9. A method according to claim 8, wherein the amount of edge enhancement is responsive to the identification of the tissue characteristic.

10. A method according to claim 1, wherein the local density is an average of the densities of tissue surrounding the tissue portion.

11. A method according to claim 1, wherein the local gradient is an average of the gradients in tissue surrounding the tissue portion.

12. A method according to claim 1, wherein the extent of the portion is at least partly based on detection of edges in the image.

13. A method according to claim 1, comprising segmenting the image into image portions containing the same tissue type.

14. A method according to claim 1, wherein the image processing technique is optimized for the spatial frequency spectrum of the tissue portion.

UNITED STATES PATENT AND TRADEMARK OFFICE
CERTIFICATE OF CORRECTION

PATENT NO. : 6,463,167 B1
DATED : October 8, 2002
INVENTOR(S) : Andre Feldman et al.

It is certified that error appears in the above-identified patent and that said Letters Patent is hereby corrected as shown below:

15. A method according to claim 1, and comprising:
identifying at least one physical characteristic of a second tissue portion based on a characteristic of a second portion of the image; and
applying a second image processing technique to the second image portion wherein the second image processing technique is different from the first image processing technique.

16. A method according to claim 15, wherein the second image processing technique is chosen to optimize the spatial frequency spectrum of the second tissue portion.

17. A method according to claim 15, wherein the second image processing technique is of a different type from the first image processing technique.

18. A method according to claim 15, wherein the first image processing technique and the second image processing technique are of the same type, said type having at least one weight and wherein the second image processing technique has at least one different weight from the first image processing technique.

19. A method according to claim 15, wherein the first image processing technique creates more severe artifacts than the second image processing techniques when applied to the second image portion.

20. A method according to claim 1, wherein the image comprises an X-ray computerized tomography image.

21. A method according to claim 1, wherein the image comprises a magnetic resonance image.

22. A method according to claim 1, wherein the image comprises an ultrasound image.

23. A method according to claim 1, wherein the image comprises a nuclear medicine image.

24. A method according to claim 1, wherein the image portion is an image pixel.

25. A method according to claim 1, wherein the image portion comprises a plurality of contiguous image pixels.

26. A method according to claim 1, wherein applying an image processing technique comprises applying the technique to the pixel values of the image.

27. A method of filtering a medical image, comprising:
receiving a medical image having a first range of pixel values;
receiving, from a user, a range of pixel values of the medical image to be displayed;
automatically processing the medical image, wherein the image processing is responsive to the range of pixel values to be displayed;
scaling the range of pixel values to be displayed to fit a range of gray levels to be displayed; and
displaying the processed and scaled image.

28. A method of filtering according to claim 27 wherein,
when the range is relatively narrow, automatically processing comprises smoothing the image or applying a noise reducing filter; and
when the range of values is relatively large, automatically processing comprises applying an edge enhancing filter.

29. Apparatus for displaying a medical image comprising:
a user input which receives a range of pixel values to be displayed on a display from a user;
circuitry which receives a medical image having a first range of pixel values and scales a

UNITED STATES PATENT AND TRADEMARK OFFICE
CERTIFICATE OF CORRECTION

PATENT NO.    : 6,463,167 B1
DATED         : October 8, 2002
INVENTOR(S)   : Andre Feldman et al.

Page 3 of 4

It is certified that error appears in the above-identified patent and that said Letters Patent is hereby corrected as shown below:

reduced range of said pixel values input into a range of gray level values suitable for display, in accordance with the user inputted range of values;
   an image processor which processes the image using a processing method automatically responsive to the magnitude of the reduced range of pixel values; and
a display which receives and displays an image which has been processed by said processor and scaled by said circuitry.

30. A method of enhancing a medical computerized tomography (CT) image comprising:
   identifying a tissue portion based on a characteristic of a portion of the CT image;
   reprojecting image data from the tissue portion to form segmented attenuation data;
   applying at least a spatial filtering step to form filtered segmented data, responsive to a classification of the tissue portion; and
   back projecting the filtered segmented data to form an adaptively filtered image.

31. A method according to claim 30 wherein back projecting includes convolving or applying an FFT to the filtered segmented data.

32. A method of enhancing a medical computerized tomography (CT) image comprising:
   identifying a plurality of tissue portions based on a characteristics of corresponding portions of the CT image;
   reprojecting image data from the tissue portions to form a plurality of segmented attenuation data sets;
   applying at least a spatial filtering step to at least one of the segmented attenuation sets to form filtered segmented data, responsive to a classification of the tissue portion; and
   back projecting the filtered segmented data to form an adaptively filtered image.

33. A method according to claim 32 wherein applying at least a spatial filtering step comprises:
   applying at least a spatial filtering step to a plurality of the segmented attenuation sets to form a plurality of filtered segmented data, responsive to a classification of the tissue portion, wherein a different filter is applied to different tissue portions.

34. A method according to claim 33 including summing the segmented attenuation data sets associated with different portions and applying a convolution or FFT to the summed data prior to back projection of the summed data.

35. A method according to claim 33 including separately applying a convolution or FFT to the filtered segmented data of the different portions prior to back projection.

36. A method according to claim 32 including summing the segmented attenuation data sets associated with different portions and applying a convolution or FFT to the summed data prior to back projection of the summed data.

37. A method according to claim 32 including separately applying a convolution or FFT to the filtered segmented data of the different portions prior to back projection.

38. A method of enhancing a medical image comprising:
   determining local image values and a local gradient of image values at a portion of the image; and
   applying a parametric image processing technique, to the image portion, the parameters of the image processing technique being responsive to the local gradient and the local density values.

39. A method according to claim 38 and including identifying a boundary between two image portions of an image and applying the first image processing technique to the boundary.

UNITED STATES PATENT AND TRADEMARK OFFICE
CERTIFICATE OF CORRECTION

PATENT NO. : 6,463,167 B1
DATED : October 8, 2002
INVENTOR(S) : Andre Feldman et al.

It is certified that error appears in the above-identified patent and that said Letters Patent is hereby corrected as shown below:

40. A method according to claim 39 wherein the parameters of the image processing technique is further responsive to the width of the boundary.
41. A method according to claim 39 wherein the parameters of the image processing technique is responsive to the types of tissues forming the boundary.
42. A method according to claim 38 wherein the parameters of the image processing technique is responsive to the types of tissues forming the boundary.
43. A method according to claim 38 wherein the local density value is an average of the density values of the density of tissues surrounding the tissue portion.
44. A method according to claim 38 wherein the characteristics of the image processing technique are determined on a pixel by pixel basis.
45. A method according to claim 38 wherein the image processing technique is a filtering technique.

Signed and Sealed this

Twenty-second Day of April, 2003

JAMES E. ROGAN
*Director of the United States Patent and Trademark Office*